United States Patent
Tavares (10) Patent No.: US 11,877,589 B2
(45) Date of Patent: Jan. 23, 2024

(54) DONUT ICER

(71) Applicant: Joe Tavares, Peabody, MA (US)

(72) Inventor: Joe Tavares, Peabody, MA (US)

( * ) Notice: Subject to any disclaimer, the term of this patent is extended or adjusted under 35 U.S.C. 154(b) by 93 days.

(21) Appl. No.: 17/375,589

(22) Filed: Jul. 14, 2021

(65) Prior Publication Data

US 2023/0016281 A1    Jan. 19, 2023

(51) Int. Cl.
| | |
|---|---|
| *A23P 20/17* | (2016.01) |
| *B65G 43/10* | (2006.01) |
| *B65G 49/02* | (2006.01) |
| *A21C 15/00* | (2006.01) |
| *B65G 23/06* | (2006.01) |
| *B65G 39/16* | (2006.01) |
| *B65G 23/24* | (2006.01) |
| *B65G 47/248* | (2006.01) |

(52) U.S. Cl.
CPC .............. *A23P 20/17* (2016.08); *A21C 15/00* (2013.01); *B65G 23/06* (2013.01); *B65G 23/24* (2013.01); *B65G 39/16* (2013.01); *B65G 43/10* (2013.01); *B65G 47/248* (2013.01); *B65G 49/02* (2013.01)

(58) Field of Classification Search
CPC ....... A23P 20/17; A21C 15/00; A21C 15/002; A23G 3/22; A23G 3/28; B65G 23/06; B65G 23/24; B65G 39/16; B65G 43/10; B65G 47/248; B65G 49/02; B65G 21/02; B65G 21/22; B65G 15/62; B05C 3/10
USPC ..................... 118/26, 28, 29; 198/860.1, 841
See application file for complete search history.

(56) References Cited

U.S. PATENT DOCUMENTS

| | | | |
|---|---|---|---|
| 2,260,686 A | 10/1941 | Segrin | |
| 2,348,800 A | 5/1944 | Fredrickson | |
| 2,417,614 A | 3/1947 | Ratcliff | |
| 2,525,164 A | 10/1950 | Ackles | |
| 2,767,641 A | 10/1956 | Ackles | |
| 2,878,776 A | 3/1959 | Vogel | |
| 3,342,159 A | 9/1967 | Jones | |
| 3,554,355 A * | 1/1971 | Berg | A01K 5/0266 198/594 |
| 4,982,835 A * | 1/1991 | Butler | B65G 21/2072 198/860.3 |
| 6,159,514 A | 12/2000 | Brummett | |
| 6,755,149 B2 | 6/2004 | Herman | |
| 7,293,525 B2 | 11/2007 | Sockman | |
| 8,161,901 B1 * | 4/2012 | DeGennaro | A21C 15/002 118/18 |
| 2016/0143325 A1* | 5/2016 | Heinzen | A23G 3/0093 426/304 |
| 2017/0265481 A1* | 9/2017 | LaMantia | A23P 20/15 |

FOREIGN PATENT DOCUMENTS

| | | |
|---|---|---|
| DE | 102008011784 | 4/2009 |
| EP | 2789240 | 10/2014 |

* cited by examiner

*Primary Examiner* — Laura Edwards
(74) *Attorney, Agent, or Firm* — Lambert Shortell & Connaughton; David J. Connaughton, Jr.; Justin P. Tinger (57) ABSTRACT

A donut icer or icing system is disclosed herein. The icing system is surprisingly more efficient than known methods of applying frosting to baked or fried goods, specifically, donuts. The increase in efficiency over known methods is accomplished generally through use of a plurality of conveyor belts, an icing bath, and a flip shaft assembly that allows frosted goods or donuts to flip icing side up before discharge from the system.

7 Claims, 4 Drawing Sheets

DONUT ICER

BACKGROUND

Technical Field

The present disclosure relates generally to devices, methods, and systems relating to icing or glazing baked or fried goods. More particularly the present disclosure relates a device, system, and method for icing donuts.

Description of Related Art

Applying icing to donuts or other types of baked or fried goods may be done by hand, which requires donuts to be iced or frosted individually. There are also methods or systems of glazing, icing, or frosting donuts that utilize a screen which may hold multiple donuts at a time that may be dipped in icing. However, these known methods or systems of applying frosting to donuts suffer from a number of shortcoming to which there are a plethora of potential solutions. One of the shortcomings of these known systems is the rate of glazed or frosted donut production, in other words, the efficiency of the overall system.

Therefore, what is needed is a donut icer having the following characteristics and benefits over the prior art.

SUMMARY

The subject matter of this application may involve, in some cases, interrelated products, alternative solutions to a particular problem, and/or a plurality of different uses of a single system or article.

In one aspect, a donut icer or icing system is disclosed. The icing system may comprise a frosting conveyor, wherein the frosting conveyor comprises a body having a first wall and a second wall. The first wall and the second wall may be connected to a plurality of conveyor belts and supported by two leg assemblies. The icing system may also comprise a pump cart, wherein the pump cart may comprise a cart frame connected to and supported by a plurality of casters. The pump cart may be connected to the body of the frosting conveyor.

In another aspect, the icing system comprises an infeed conveyor, a center conveyor, a discharge conveyor, and a shaft motor. The infeed conveyor, center conveyor, and discharge conveyor may generally comprise a conveyor material wrapped around and engaging with a plurality of shafts and a plurality of gears to form a continuous conveyor loop having a top layer and a bottom layer. The shafts may be connected to the plurality of gears and may be connected to the body of the frosting conveyor between the top layer and bottom layer of the continuous conveyor loops of each of the conveyors. The shaft motor may operate the conveyors.

In yet another aspect, the pump cart of the icing system comprises an icing reservoir, an icing pump, and a control box, wherein the icing reservoir is connected to the icing pump and the pump cart is connected to the body of the frosting conveyor. The control box may be connected to the pump cart and may comprise a control array that may operate the elements attached to the pump cart, such as the icing pump.

It should be expressly understood that the various elements of the present may be of varying sizes, shapes, or otherwise dimensions without straying from the scope of the present disclosure.

DETAILED DESCRIPTION

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a device, a method, and a system relating to icing or glazing baked, fried, or otherwise cooked goods. More specifically, most embodiments of the present disclosure relate to a device, a method, or a system for applying frosting to donuts. However, the disclosure contained herein may be capable of being used to coat a surface of any edible food that is able to be placed on a conveyor belt without falling through the space between the mesh material that may comprise the conveyor. The embodiments described herein may provide a more efficient system or method of frosting donuts or other similar baked or fried goods than such devices, systems, or methods already known in the art due to the unique combination of elements described herein.

In most embodiments, the device utilized to frost baked or fried goods may comprise a frosting conveyor. The frosting conveyor may generally be provided icing through use of a pump cart that may comprise an icing reservoir containing said icing in combination with an icing pump. In some embodiments, the combination of the frosting conveyor and the pump cart may be referred to as the icer, and in other embodiments, the combination of the conveyor and the cart may constitute a system for icing baked or fried goods. In preferred embodiments, the frosting conveyor, pump cart, icer, or icing system may be used to ice, frost, or otherwise apply a coating or glaze to donuts. Similarly, in preferred embodiments, the frosting conveyor, pump cart, icer, or icing system may be constructed from stainless steel material and precision machined components; however, other suitable material and machined components may be utilized depending on the embodiment.

In most embodiments, the frosting conveyor may comprise a body. In some embodiments, the body may comprise two walls, a first wall and a second wall, which may be connected to a plurality of conveyor belts and supported at least by two leg assemblies. In some embodiments, the leg assemblies may comprise wheels or casters connected to the leg assemblies, which may allow for easy mobility of the frosting conveyor. In some embodiments, the wheels or casters connected to the leg assemblies may comprise a locking mechanism, which may lock the wheels or casters in place and prevent rotation and movement of the wheels or casters while the frosting conveyor is in use. This feature may be one of the ways in which the frosting conveyor is stabilized.

In most embodiments, the body of the frosting conveyor may comprise a control panel which may be electrically connected to some of the machinery located on the body of the frosting conveyor. In preferred embodiments, the control panel may be attached to either the first wall or the second wall of the frosting conveyor. A control panel shield may cover the control panel and may be hingedly connected to one of the first wall or the second wall. The control panel shield may serve multiple purposes including, but not limited to, preventing the controls on the control panel from accidentally being accessed or interacted with while the frosting conveyor is in operation, and the hinged connection may provide a convenient way to access the control panel. In most embodiments, the control panel, at the very least, may operate conveyor belts on the frosting conveyor and may contain various controls, buttons, and displays thereon for carrying out said operation. For example, in some embodiments, the control panel may comprise controls for powering the conveyor belts on or off, adjusting the speed of the conveyor belts up or down (in some embodiments where the speed of the conveyor belts is adjustable), and a display indicating the current frequency or speed the conveyor belts. In some embodiments, the control panel may be a tech frequency inverter or a variable frequency drive.

In most embodiments, the frosting conveyor may comprise conveyor belts, which may be operable by a control panel, such as the panel described herein. The conveyor belts may be constructed from conveyor material, such as a stainless steel wire-rod material and belting or wire mesh material; however, other suitable materials and belting may be utilized. In most embodiments, the conveyor belts may comprise a plurality of shafts having a plurality of gears thereon that engage with the conveyor material. The plurality of shafts may be connected at opposite ends of the shafts to the first wall and the second wall of the frosting conveyor body, respectively. In some embodiments, the shafts of the conveyor belts may be idler shafts. In preferred embodiments, the shafts of the conveyor belts may be driven by at least one drive shaft. For example, in some embodiments, the gears on at least one idler shaft of the conveyor belt may interact or engage with the drive shaft or gears of the drive shaft, and the turning of the drive shaft may cause the idler shafts to rotate. In other embodiments, the drive shaft may comprise a plurality of gears that interact or engage with the conveyor material. In these embodiments, the turning of the drive shaft may also cause the idler shafts of the same conveyor belt or conveyor belt system to turn based on the idler shafts interaction or engagement with the same conveyor material forming the belt.

In preferred embodiments, at least one drive shaft is connected to and operable via a shaft motor. The shaft motor may comprise a gear motor or a duty motor. In some embodiments, the control panel may operate the conveyor belts by being electrically connected to the shaft motor by at least one shaft motor wire, wherein the shaft motor may cause at least one drive shaft to turn, which may cause the idler shafts of the conveyor belts to turn, rotate, or otherwise move a disclosed herein. In some embodiments, the conveyor belts may turn, rotate, or otherwise be operable through the turning of the drive and idler shafts due to the interaction between the gears of the shafts and the spacing between the conveyor belt material, such as stainless steel wire-rod, belting, or wire mesh material. In most embodiments, the material forming the conveyor belt may be able to turn with the shafts and any corresponding gears thereon because the material forming the conveyor belt may be wrapped around the shafts and any gears thereon to form a continuous conveyor loop. This or a similar formation of conveyor material may effectively create a top layer and a bottom layer of conveyor material, wherein a space is defined between the two layers. When the conveyor belts rotate, the top layer may become the bottom layer, and the bottom layer may become the top layer, due to the continuous turning of the conveyor belt.

In some embodiments, the frosting conveyor may comprise a plurality of dividers in the space between the top layer and bottom layer of conveyor material and the shafts. In these embodiments, the dividers may be connected to the walls of the conveyor and may serve the purpose of separating a top conveyor material layer from a bottom conveyor material layer in order to reduce or eliminate any potential arching or bridging of the conveyor system. In some embodiments, the dividers may be connected to a plurality of rods, which may be connected at opposite ends of the rods to the first and the second wall of the conveyor body. In some embodiments, at least one face of the divider makes contact or engages with the top or the bottom layer of at least one of the conveyors. In some embodiments, the dividers may be Ultra High Molecular Weight Polyethylene ("UHMW") dividers. The advantages of using the UHMW material to form the dividers may be that UHMW has a low coefficient of friction with minimal moisture absorption to provide an efficient conveyor system for the movement of baked or fried goods.

In preferred embodiments, the frosting conveyor may comprise two ends, a first end and a second end, and three conveyor belts, an infeed conveyor, a center conveyor, and a discharge conveyor. In some embodiments, any one of these three conveyor belts may further comprise individual portions, segments, sections or conveyors. For example, in some embodiments, wherein the frosting conveyor comprises an icing bath extending from the first wall to the second wall, the center conveyor may comprise an icing bath section, wherein the icing bath may be located in the space between the top layer and the bottom layer of the center conveyor that defines the icing bath section, portion, or segment of the center conveyor. To take another example, in the same embodiments or in other embodiments, the discharge conveyor may comprise a sloped section and a level section. In some embodiments, the infeed conveyor, the center conveyor, and the discharge conveyor each may comprise two ends, a first end and a second end. In most embodiments, the shafts of the infeed, center, and discharge conveyors may be idler shafts having gears thereon connected to or engaging with the material that forms the conveyor.

In some embodiments, both the first end and the second end of the infeed conveyor may comprise a shaft having a plurality of gears and connected at opposite ends of the shaft to the first and second wall of the body of the frosting conveyor. The first end of the infeed conveyor may be located at the first end of the body of the frosting conveyor, and the second end of the infeed conveyor may be connected to or located very close to the first end of the center conveyor. In some embodiments, the center conveyor may comprise two ends, a first end and a second end, and an icing bath may be positioned somewhere between the two ends between the top and bottom layers of conveyor material that forms the center conveyor. The first end of the center conveyor may comprise shafts having gears connected to or engaging with the material of the conveyor. In some embodiments, the shaft at the first end of the center conveyor may be the same shaft comprising the second end of the infeed conveyor. The second end of the center conveyor may comprise a flip shaft assembly downstream from the icing bath section of the center conveyor. In some embodiments, the flip shaft assembly may comprise a drive shaft engaging with or connected to an idler shaft.

In some embodiments, the body of the frosting conveyor comprises an icing bath connected or secured to at least one of the walls of the body. In some embodiments, the icing bath may be removable from the conveyor by being disconnected from at least one of the walls of the conveyor body. In other embodiments, the icing bath may be placed in the body of the conveyor through an aperture defined in one of the walls of the conveyor body. For example, the body may comprise a platform connected at opposite ends of the platform to the first wall and second wall of the body, which supports the icing bath. In these embodiments, the icing bath may be removable from the body of the frosting conveyor through the aperture defined in at least one wall of the body. In some embodiments, the aperture may comprise a slot or other similar type of opening, and an end of the icing bath may protrude through the slot. The end of the icing bath protruding through the aperture or the slot may comprise a handle, which may allow the icing bath to be easily slid in and out of the body of the frosting conveyor. The icing bath may be removed for cleaning, maintenance, or other reasons.

In some embodiments, the icing bath may be filled by icing that flows into the bath from an icing pipe connected at one end of the pipe to an icing bath intake and connected at another end of the pipe to an icing pump. In some embodiments, the icing bath intake may be connected to one of the walls of the conveyor body, wherein both the portion of the conveyor body connected to the intake and the intake itself may define apertures for the icing to flow through and into the bath. In most embodiments, the goods may be placed on the first end of the infeed conveyor, where the goods may be carried by the conveyor belts to the icing bath portion of the center conveyor. In most embodiments, as the goods pass over the icing bath, the top face or the icing side of the goods, which may be facing downward on the center conveyor, may be glazed, frosted, iced or otherwise covered or coated by the icing or frosting within the bath. In most embodiments, the goods may be able to be coated by the icing in the bath because the spacing between the material forming the center conveyor may allow the icing in the bath and the icing side of the donuts to interact with each other. In some embodiments, as the goods pass over the icing bath, they may be aligned or held down by a top roller. In most embodiments that utilize the top roller, the top roller may be connected at opposite ends of the roller to two adjusters, which may be connected to the first and second wall of the conveyor body, respectively. In these embodiments, the adjusters may allow the distance between the bottom of the top roller and the top layer of the center conveyor to be adjusted by turning, pulling, or otherwise mechanically operating the adjusters. The adjusting of the relative distance between the bottom of the top roller and the top of the center conveyor may be referred to as adjusting the height of the top roller. In some embodiments, the top roller may be used to align goods as they move away from the icing bath, additionally or alternatively, to being used to align or hold down goods as they are iced.

In some embodiments, the flip shaft assembly portion of the center conveyor may be substantially level with the icing bath portion of the center conveyor. In other embodiments, the flip shaft assembly portion of the center conveyor may be elevated with respect to the icing bath portion of the center conveyor. In both types of embodiments, the baked or fried goods coated with icing may be flipped onto the discharge conveyor due to the force of gravity acting on the goods combined with the height differential between the end of the discharge conveyor positioned under the center conveyor and the flip shaft assembly. In some embodiments, the discharge conveyor may comprise two ends, a first end and a second end, and two sections, a sloped section and a level section. In some embodiments, the first end of the discharge conveyor may comprise a sloped conveyor having two ends, wherein one end of the sloped conveyor may be positioned under the flip shaft assembly of the center conveyor, and the other end of the sloped conveyor may be connected to or positioned near the level section of the discharge conveyor. In some embodiments, there may be a height differential between the end of the sloped conveyor positioned under the flip shaft assembly and the flip shaft assembly. This height differential may allow goods falling from the flip shaft assembly onto the discharge conveyor to flip so that the top face or icing side of the goods are facing upward on the discharge conveyor. The goods may then be transported by the discharge conveyor from the sloped section of the discharge conveyor to the level section of the discharge conveyor, which may be located at the second end of the discharge conveyor and the conveyor body.

In some embodiments, the level section of the discharge conveyor may be substantially level with the infeed conveyor and the center conveyor. In some embodiments, the frosting conveyor comprises funnel plates at an end or portion of the discharge conveyor to line the donuts or other goods up for packaging or otherwise presenting for serving. For example, in some embodiments, the level section of the discharge conveyor at the second end of the discharge conveyor may comprise funnel plates that may separate goods into individual groups for packaging or general serving preparation. At the second end of the discharge conveyor or the conveyor body, the goods may then be discharged or ejected from the body of the frosting conveyor and prepared for serving. In some embodiments, the goods may be ejected onto trays, which, in some embodiments, may be advantageously attached to the body. The trays may also be attached to the underside of the body for convenient storage while the frosting conveyor may or may not be in use. Alternatively or simultaneously, the trays may be placed or stored across the tops of the first wall and the second wall.

In some embodiments, the body of the frosting conveyor may also comprise at least one emergency stop button, which may be electrically connected through stop button wires to the shaft motor. The stop button wires may be held to the body of the frosting conveyor by rings or other similar types of connectors. In the embodiments that utilize at least one emergency stop button, the emergency stop button may be pressed to immediately stop turn the shaft motor off, which in turn may cause the drive shaft to stop turning, thus causing the conveyor belts to turn off. The embodiments containing this aspect may provide additional safety benefits to an already improved device or system for coating goods with icing. In some embodiments, the icer or the system incorporating the frosting conveyor may perform at a rate of 400 dozen goods per hour. The rate of performance may refer to the amount of goods having one side completely coated in icing after being passed through the device or system.

In most embodiments, the icer or the system utilizing the frosting conveyor may also incorporate the use of a pump cart, which may increase the efficiency of the icer device or icing system. In some embodiments, the pump cart may comprise a handle connected to an electric control box. Depending on the embodiment, the electrical input required to operate the pump cart, the frosting conveyor, or both may be 220 Volts, 60 Hertz, or a three (3) phase input, alternatively or simultaneously. The handle and the electric control box may both be connected to and supported by a cart frame. The cart frame may also be connected to and supported by a plurality of wheels or casters. The control box may also comprise a control array. In some embodiments, an electric control box may be connected to and supported by either the frame or handle of the pump cart. The electric control box may be electrically connected to various appliances, sensors, displays, and other elements that may be necessary to operate the pump cart. The control array may comprise various buttons, knobs, switches, displays or otherwise controls to carry out the operation of the pump cart. In most embodiments, the pump cart may comprise an icing pump, an icing reservoir, a water tank, a heater, agitators, a mixer motor, heating elements within the icing reservoir, and digital temperature sensors. Many of the aforementioned elements may require an electrical connection and a controller for operation, and the electric control box combined with the various controls and displays thereon may serve this purpose. For example, in some embodiments, the control array may comprise a display indicating the temperature of the water in the water tank based on the information electrically transmitted to the display from digital temperature sensor that may be attached to the water tank. Similarly, in some embodiments, a side of the control box separate from the control array may comprise a heater switch for turning on the heater to heat the water in the water tank. The control box may also comprise an emergency stop button, switch, or similarly structured controller for powering off at least one of the components electrically connected to the control box. The control box may also comprise a switch, button, or other similarly structure control for turning off power to all the electrical connections in the control box. In most embodiments, the control of the pump cart elements may be accomplished by connections in the control box that may be electrical connections to both the various control and display elements on the control box and the various elements on the pump cart, including, but not limited to, the icing pump, the icing reservoir, the water tank, the heater, the agitators, the mixer motor, the heating elements within the icing reservoir, and the digital temperature sensors.

In some embodiments, the icing pump on the pump cart may comprise a pump intake pipe and a pump outfeed pipe, and the icing reservoir may comprise a reservoir outfeed pipe. Before or during operation, the icer or the icing system may comprise an icing pipe or individual icing pipe segments, sections, or portions, which may connect the reservoir outfeed pipe to the pump intake pipe and the pump outfeed pipe to the icing bath intake, respectively. In some embodiments, icing may be poured into the icing reservoir, and, when the icer or the icing system is in operation, icing may then be pumped by the icing pump from the icing reservoir through the icing pump and into the icing bath through the icing pipe or individual icing pipe segments connecting the icing reservoir, the pump, and the bath, respectively. The icing pump may be electrically connected to the control box and may be operable by at least one control thereon. In some embodiments, the speed at which the icing pump pumps icing from the icing reservoir to the icing bath may be adjusted. In these embodiments, the icing pump may be operable by a knob on the control box that may increase the speed of the icing pump as the dial is turned, in preferred embodiments, in a clockwise direction. In some embodiments, the control array may comprise the knob that controls the icing pump. In some embodiments, the icing pump may comprise a sanitary rotary pump.

In some embodiments, the icing reservoir may comprise a frosting funnel, a reservoir, and a water tank. In other embodiments, the icing reservoir may comprise a frosting funnel and a water tank. In yet other embodiments, the icing reservoir may comprise a reservoir and a water tank. In all these embodiments, the combination and attachment of each of the elements together may be referred to as the icing reservoir. In most embodiments, the icer or the icing system may make the icing poured into the icing reservoir less viscous and thus easier to pump by a heating process. In preferred embodiments, the icer or the icing system may utilize heated water in a water tank to heat the icing in the reservoir through conduction or convection. In some embodiments, the reservoir and the water tank may be siloed from one another in individual compartments within the icing reservoir. However, in these embodiments, despite being siloed from one another in individual compartments, the heat from the heated water may transfer to the icing in the reservoir by conduction. In some embodiments, the conductive transfer of heat from the water to the icing may be accomplished by the reservoir and the water tank sharing a single wall in the preferred four wall individual compartment embodiments. In other embodiments, the water tank and the icing reservoir may comprise the same structure, and the heat transfer between the water and the icing may occur through convection or the contact of the two fluids (i.e., the water and the icing). The water in the water tank may be heated by a heater. In some embodiments, alternatively or simultaneously, the heater may comprise water heating elements inside the icing reservoir or the water tank, respectively. The heater may be turned on by a heater switch on the control box, which may or may not be located on the control array. Alternatively or simultaneously, the heat generated by the heater or the heating elements may be controlled by temperature controllers on the control box. In some embodiments, the water used to heat the icing may be no more than 212° F. or boiling temperature; however, in most embodiments the water temperature used to heat the icing may be about 160° F. to about 170° F. In some embodiments, temperature sensors within the icing reservoir may allow a temperature display on the control box to indicate the temperature of the water within the tank, wherein the water may be poured into the tank via a filler pipe. In some embodiments, the water tank may have a volume of fifteen (15) gallons, and the icing reservoir may have a volume of thirteen (13) gallons.

In some embodiments, the icing reservoir may comprise at least one agitator, and the viscosity of the icing may be reduced by the combination of the agitator or agitators and heat from the water. In some embodiments, the agitator or agitators may comprise agitator shafts and mixing blades, and the combination of both elements may be referred to as the agitator or agitators. The agitators may operate via a mixing motor, which may cause the agitator shafts and, consequently, the mixing blades to turn and mix or agitate the icing being poured into the icing reservoir. In some embodiments, the mixing motor may comprise a gearmotor, and in other or similar embodiments, the speed with which the mixing motor turns the agitator or agitators may be adjustable. The mixing motor and, in some embodiments, the speed of the mixing motor may be operable by at least one control on the control box. Depending on the embodiment, the icing reservoir may comprise a frosting funnel covering the reservoir, the water tank, or both, wherein the frosting funnel may define at least one aperture, which may allow icing to flow through and into the reservoir or the water tank. In some embodiments, the frosting funnel may comprise at least one agitator so that as icing is poured into the funnel the rotating agitators may mix or agitate the icing, which may assist with the lowering of the icing's viscosity. In some embodiments, the icing may be poured from a bucket down an icing slide, which, in some embodiments, may be connected to the icing reservoir and supported by support bars. In some embodiments, the icing system may comprise a stand connected to or separate from the icing slide, wherein an open bucket of icing may be placed on the stand and may pour into the icing reservoir through the force of gravity alone (i.e., without someone holding the bucket).

A method of frosting donuts may also be disclosed herein. In some embodiments, the method may comprise, in no particular order, any of the following steps: filling the water tank; turning the heater on; allowing the water in the water tank to reach the appropriate temperature indicated on a temperature display; turning the conveyor belts on; filling the icing reservoir; turning at least one agitator on; connecting the icing reservoir, the icing pump, and the icing bath, turning the icing pump on; allowing the icing to fill the icing bath; placing a screen of goods above the infeed conveyor; placing goods in predetermined lines on the infeed conveyor; and moving iced goods from the second end of the discharge conveyor onto trays. In some embodiments, the number of goods placed in predetermined lines on the infeed conveyor may be 6. For example, in some embodiments, the method may comprise the steps of placing donuts in parallel lines of 6 on the infeed conveyor. Any of the elements or aspects of the icer or the icing system disclosed herein may be used in the disclosed method that may be necessary to effectuate the step of the method. For example, the step of turning at least one agitator on may comprise the additional step of pressing a button on the control array in order to turn the mixer motor on. It should also be noted that the icer or the icing system disclosed herein may comprise any additional elements or aspects to carry out a step of the method that may not have been expressly disclosed herein.

Figure 1:
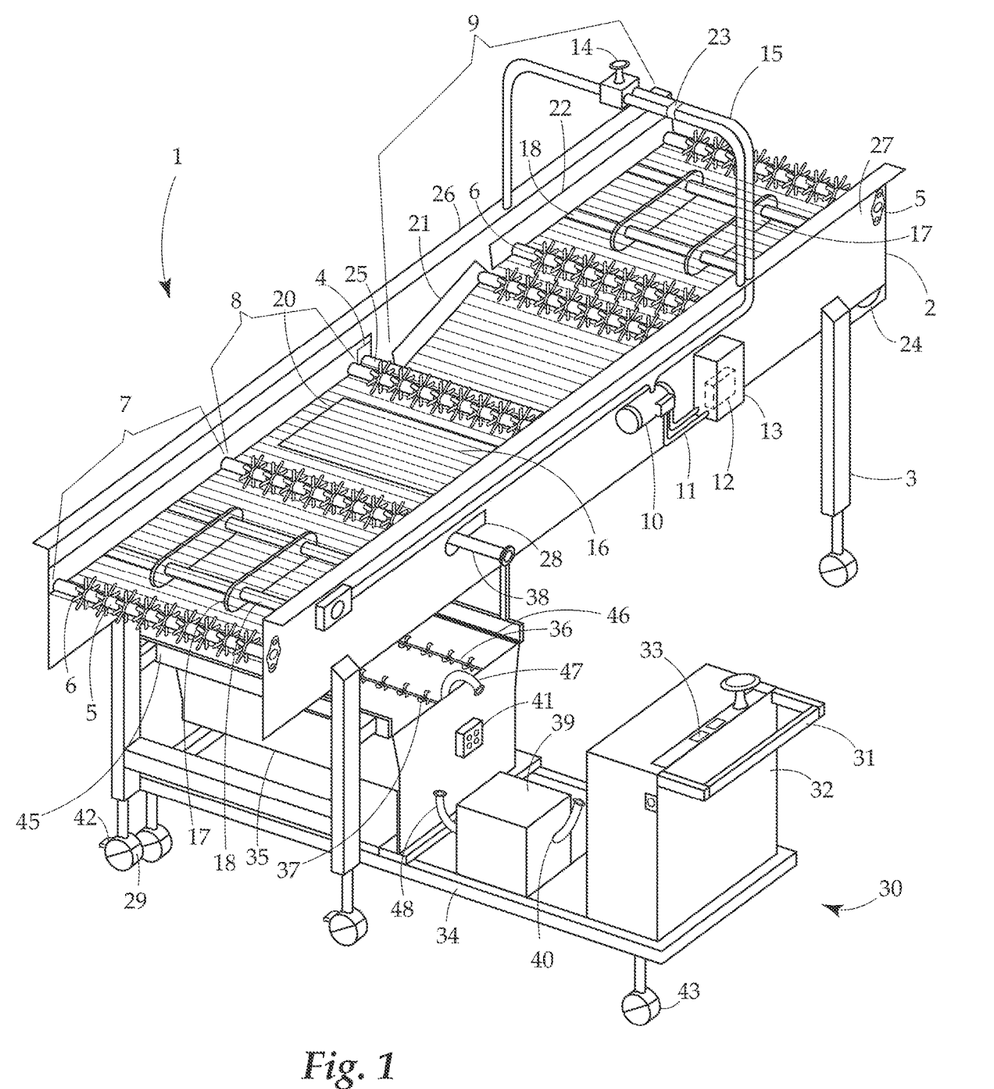
FIG. 1 provides a perspective view of an embodiment of the present disclosure.

Turning now to FIG. 1, which shows an embodiment of a frosting conveyor 1 and a pump cart 30. Turning first to the frosting conveyor 1, the conveyor body 2 of the frosting conveyor 1 generally comprises a first wall 26 and a second wall 27. In this embodiment, the first wall 26 and the second wall 27 are connected to each other and supported by two leg assemblies 3. In this embodiment, the leg assemblies 3 are connected to and supported by casters 29, and the casters 29 comprise locking mechanisms 42. The second wall 27 of the conveyor comprises a control panel shield 13, which covers a control panel 12 and is hingedly connected to the second wall 27. The control panel 12, having various buttons, controls, or displays thereon (not shown), operates and is electrically connected to the shaft motor 10 by a plurality of shaft motor wires 11. In this embodiment, the work generated by the shaft motor 10 causes the drive shaft 25 to turn, which then causes idler shafts 5 to turn. Each idler shaft 5 comprises a plurality of gears 6 that engage with a wire mesh material 16, which is the material that forms conveyor belts 7, 8, and 9. In this embodiment, the infeed conveyor 7 and the discharge conveyor 9 both comprise at least one divider 17 connected to rods 18, which are connected at opposite ends to both the first wall 26 and the second wall 27 of the body 2. In this embodiment, the dividers 17 and the rods 18 exist in the space between the top layers and the bottom layers of the infeed conveyor 7 and the discharge conveyor 9, respectively.

Figure 2:
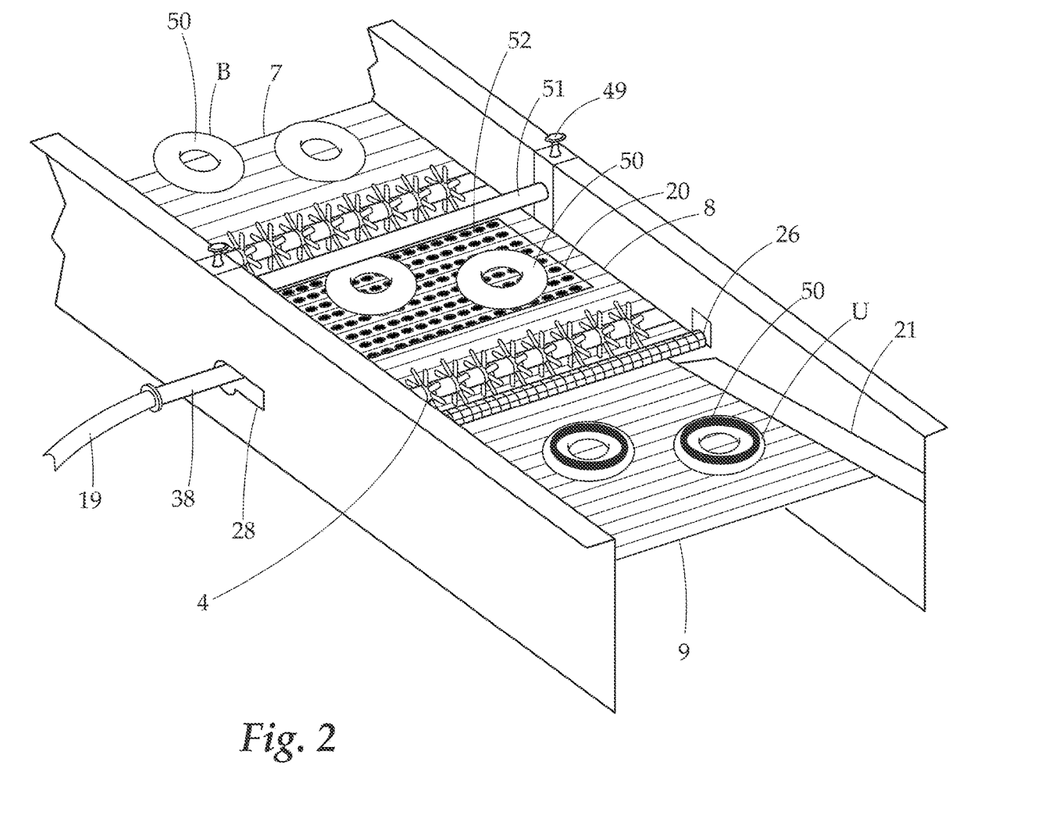
FIG. 2 provides a perspective view of another embodiment of the present disclosure.

As shown in FIG. 2, when the conveyor belts 7, 8, and 9 are in operation, the infeed conveyor 7 carries donuts 50 toward the center conveyor 8, wherein a bottom face B of the donuts 50 are facing upward. In the embodiments shown in FIG. 1 and FIG. 2, the center conveyor 8 comprises an icing bath 20, which is secured at opposite ends to the first wall 26 and the second wall 27, respectively. The icing bath 20 is filled with icing 52, which flows into the bath 20 from an icing pipe 19 connected to an icing bath intake 38. The icing bath 20 is removable from the conveyor body 2 by being disconnected or unsecured from the first wall 26 and the second wall 27, and being slid out through aperture 28, which, in these embodiments, is a slot defined in the second wall 27 of the conveyor body 2. When the donuts 50 reach the center conveyor 8, the top face U of the donuts 50, which is facing downward on the center conveyor 8, is glazed or frosted with icing 52 from the icing bath 20. In the embodiment shown in FIG. 2, as the donuts 50 pass over the icing bath 20, they are aligned by top roller 51, the height of which can be adjusted by top roller adjusters 49. In the embodiment shown in FIG. 1 and FIG. 2, the flip shaft assembly 4, which comprises the drive shaft 25 and an idler shaft 5 at an end of the center conveyor 8, is elevated with respect to the portion of the center conveyor 8 covering the icing bath 20. An end of the sloped section 21 of the discharge conveyor 9 is positioned under the flip shaft assembly 4. In this embodiment, the force of gravity combined with the height differential between the flip shaft assembly 4 and the end of the discharge conveyor 9 positioned under the flip shaft assembly 4 allows the donuts 50 to flip while falling from the center conveyor 8 to the discharge conveyor 9. In this embodiment, this process allows the top face U of the donuts 50, now coated with icing 52 from the icing bath 20, to be facing upward on the discharge conveyor 9. The donuts 50 are then transported on the discharge conveyor 9 from the sloped section 21 to the level section 22 of the discharge conveyor 9, where the donuts 50 are then ejected from the body 2 of the frosting conveyor 1.

Turning back to solely discussing the embodiment shown in FIG. 1, the body 2 of the frosting conveyor 1 also comprises two emergency stop buttons 14, which are electrically connected by stop button wires 15 to the shaft motor 10. In this embodiment, the stop button wires 15 are held to the body 2 of the frosting conveyor 1 by rings 23. The body 2 also comprises trays 24, which are attached to or stored on the body 2. FIG. 1 also shows a perspective view of an embodiment of the pump cart 30 and the icing reservoir attached thereon. In this embodiment, the pump cart 30 comprises a handle 31 connected to an electric control box 32, which are both connected to and supported by a cart frame 34. The cart frame 34 is also connected to and supported by four casters 43. The control box 32 also comprises a control array 33. The electrical connections in the control box 32 connected to the control array 33 are also electrically connected to an icing pump 39 and a temperature sensor 41. The icing pump 39 comprises a pump intake pipe 48 and a pump outfeed pipe 40. In this embodiment, when the icing system is in operation (not shown), the pump intake pipe 48 is connected by an icing pipe 19 (shown in FIG. 2) to the reservoir outfeed pipe 47, and the pump outfeed pipe 40 is connected to the icing bath intake 38 also by an icing pipe 19 (shown in FIG. 2). Icing 52 (shown in FIG. 2) is then pumped from the icing reservoir 35; through the reservoir outfeed pipe 47; into the pump intake pipe 48; through the icing pump 39; out the pump outfeed pipe 40; and into the icing bath intake 38 all via an icing pipe 19 (shown in FIG. 2) connection.

Figure 3:
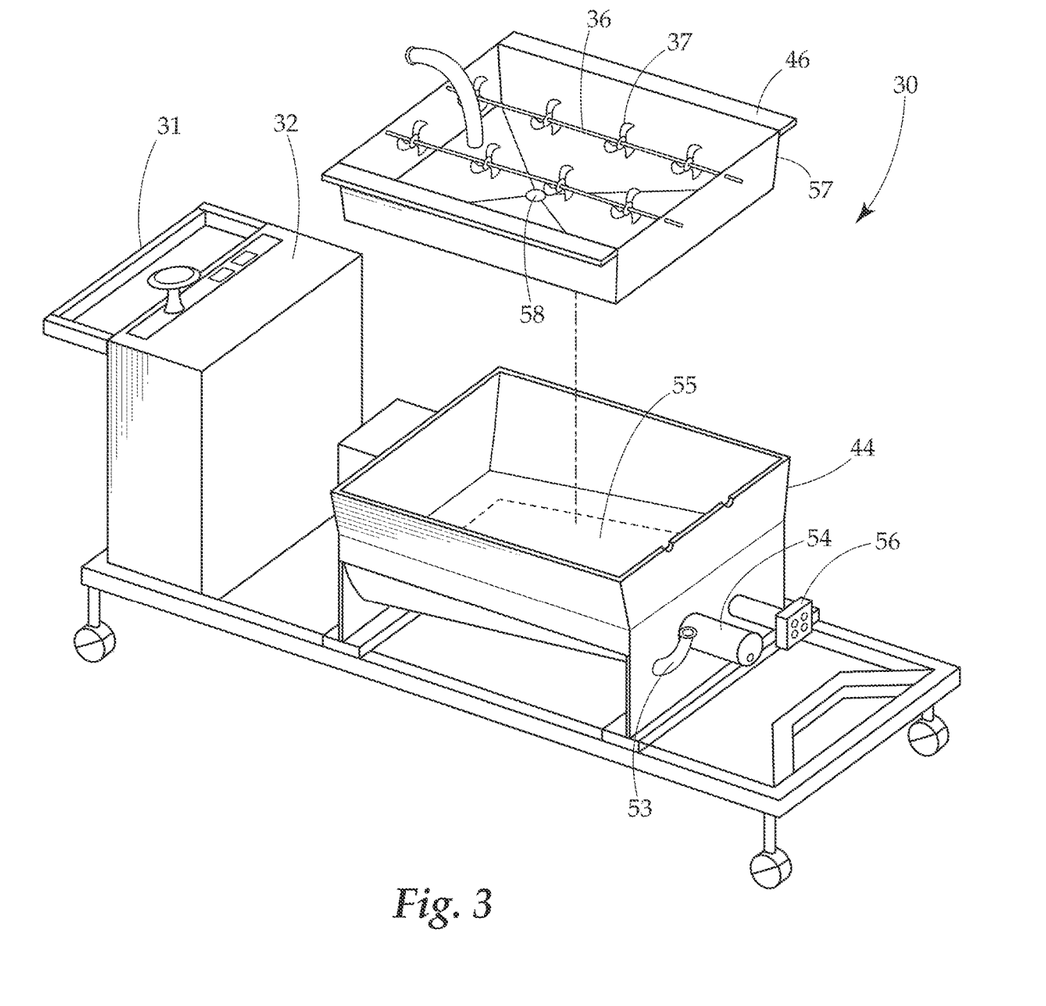
FIG. 3 provides a partially exploded perspective view of another embodiment of the present disclosure.

Turning now to a discussion of FIG. 1 and FIG. 3. FIG. 3 shows a partially exploded embodiment of the pump cart 30. The embodiment shown in FIG. 3 shows the control box 32 connected to the handle 31 of the pump cart 30. The partially exploded embodiment in FIG. 3 and the non-exploded embodiment in FIG. 1 give different views of the agitator shafts 36, which comprise a plurality of mixing blades 37. When in operation, the agitator shafts 36 are caused to rotate by the mixer motor 54, which in turn causes the mixing blades 37 to mix or agitate icing 52 (shown in FIG. 2) that is being poured into the frosting funnel 57. In the embodiment shown in FIG. 3, the frosting funnel 57 defines an aperture 58 through which icing 52 (shown in FIG. 2) may flow into the reservoir 44. The icing 52 (shown in FIG. 2) can then be heated by hot water (not shown) in the water tank 55. The water tank 55 can be filled with water (not shown) via the filler pipe 53, and the water (not shown) can be heated by heater 56. In the embodiments shown in FIG. 3 and FIG. 1, the frosting funnel 57 and the icing reservoir 35, respectively, comprise flanges 46, which, as shown in FIG. 1, contact or engage with rails 45 attached to the frosting conveyor 1.

Figure 4:
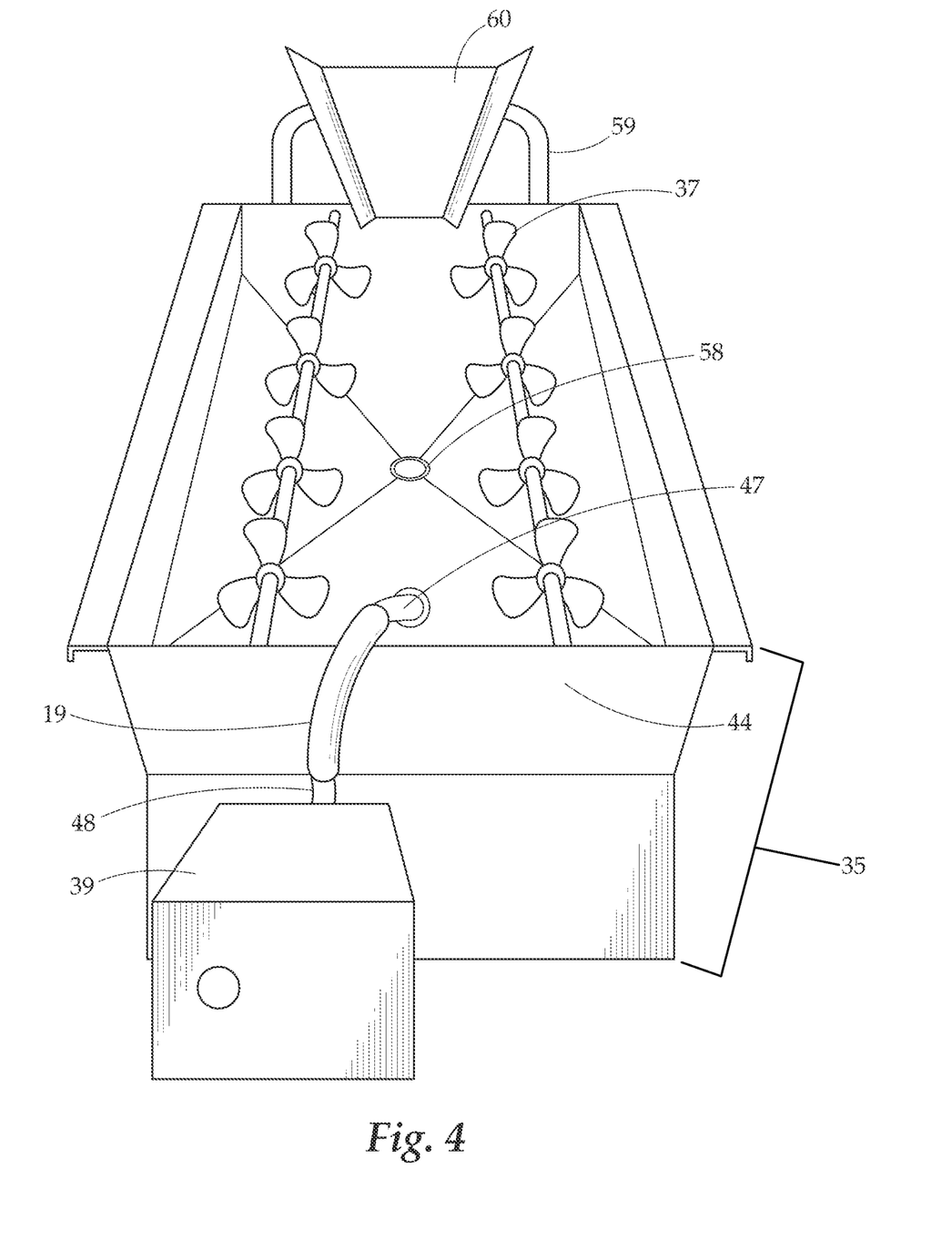
FIG. 4 provides a perspective view of yet another embodiment of the present disclosure.

FIG. 4 shows an embodiment of the icing reservoir 35 that is connected by support bars 59 to an icing slide 60. In this embodiment, icing 52 (shown in FIG. 2) can be poured down the icing slide 60; mixed by mixing blades 37, when in operation; through the aperture 58, and into the reservoir 44. When the icing pump 39 is in operation, icing 52 (shown in FIG. 2) will flow through the reservoir outfeed pipe 47; through an icing pipe 19; and into the pump intake pipe 48.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth.

What is claimed is:

1. An icing system comprising:
    a frosting conveyor, wherein the frosting conveyor comprises a body and the body comprises a first wall and a second wall, wherein the first wall and the second wall are connected to an infeed conveyor, a center conveyor, and a discharge conveyor, and the first wall and the second wall are supported by two leg assemblies;
    the infeed conveyor comprising a conveyor material, a shaft, and a plurality of gears, wherein the plurality of gears of the infeed conveyor are attached to the shaft of the infeed conveyor, and the plurality of gears of the infeed conveyor engage with the conveyor material of the infeed conveyor, wherein the shaft of the infeed conveyor is connected to the body of the frosting conveyor and the conveyor material of the infeed conveyor wraps around the shaft of the infeed conveyor forming a continuous conveyor loop, wherein the continuous conveyor loop of the infeed conveyor comprises a top layer and a bottom layer;
    the center conveyor comprising a conveyor material, two shafts, and a plurality of gears, wherein the plurality of gears of the center conveyor are attached to the two shafts of the center conveyor, and the plurality of gears of the center conveyor engage with the conveyor material of the center conveyor, wherein the two shafts of the center conveyor are connected to the body of the frosting conveyor and the conveyor material of the center conveyor wraps around the two shafts of the center conveyor forming a continuous conveyor loop, wherein the continuous conveyor loop of the center conveyor comprises a top layer and a bottom layer;
    the discharge conveyor comprising a conveyor material, three shafts, and a plurality of gears, wherein the plurality of gears of the discharge conveyor are attached to the three shafts of the discharge conveyor, and the plurality of gears of the discharge conveyor engage with the conveyor material of the discharge conveyor, wherein the three shafts of the discharge conveyor are connected to the body of the frosting conveyor and the conveyor material of the discharge conveyor wraps around the three shafts of the discharge conveyor forming a continuous conveyor loop, wherein the continuous conveyor loop of the discharge conveyor comprises a top layer and a bottom layer;
    the frosting conveyor further comprising a shaft motor and a drive shaft, wherein the shaft motor is attached to the body of the frosting conveyor and the drive shaft is connected to the shaft motor, wherein the drive shaft engages with one of the two shafts of the center conveyor and one of the three shafts of the discharge conveyor; and
    a pump cart, wherein the pump cart comprises a cart frame, a plurality of casters, an icing reservoir, an icing pump, and a control box, wherein the cart frame is connected to and supported by the plurality of casters, and wherein the icing reservoir, the icing pump, and the control box are attached to the cart frame, and the control box is electrically connected to the icing pump;
    wherein the pump cart is connected to the body of the frosting conveyor and the control box comprises a control array attached and electrically connected to the control box.

2. The icing system of claim 1, wherein the body of the frosting conveyor comprises an icing bath connected to the body, wherein the icing reservoir comprises a reservoir outfeed pipe, the icing pump comprises a pump intake pipe and a pump outfeed pipe, and the body of the frosting conveyor comprises an icing bath intake, wherein the reservoir outfeed pipe is connected to the pump intake pipe by an icing pipe, and the pump cart is connected to the body of the frosting conveyor by the pump outfeed pipe being connected to the icing bath intake by an icing pipe.

3. The icing system of claim 2, wherein the icing bath is connected to the body of the frosting conveyor between the top layer and the bottom layer of the continuous conveyor loop of the center conveyor.

4. The icing system of claim 1, wherein the body of the frosting conveyor comprises a control panel attached to the body, wherein the control panel is electrically connected to the shaft motor by at least one shaft motor wire.

5. The icing system of claim 1, wherein the frosting conveyor comprises a plurality of dividers and a plurality of rods, wherein the plurality of dividers are connected to the plurality of rods, and the plurality of rods are connected to the body of the frosting conveyor between the top layer and the bottom layer of the continuous conveyor loop of the infeed conveyor and the continuous conveyor loop of the discharge conveyor.

6. The icing system of claim 1, wherein the frosting conveyor further comprises a top roller and two adjusters, wherein the top roller is connected to the two adjusters, and the two adjusters are attached to the body of the frosting conveyor above an icing bath section of the center conveyor.

7. The icing system of claim 6, wherein the center conveyor comprises a flip shaft assembly downstream from the icing bath section of the center conveyor.

\* \* \* \* \*